United States Patent Office 3,356,749
Patented Dec. 5, 1967

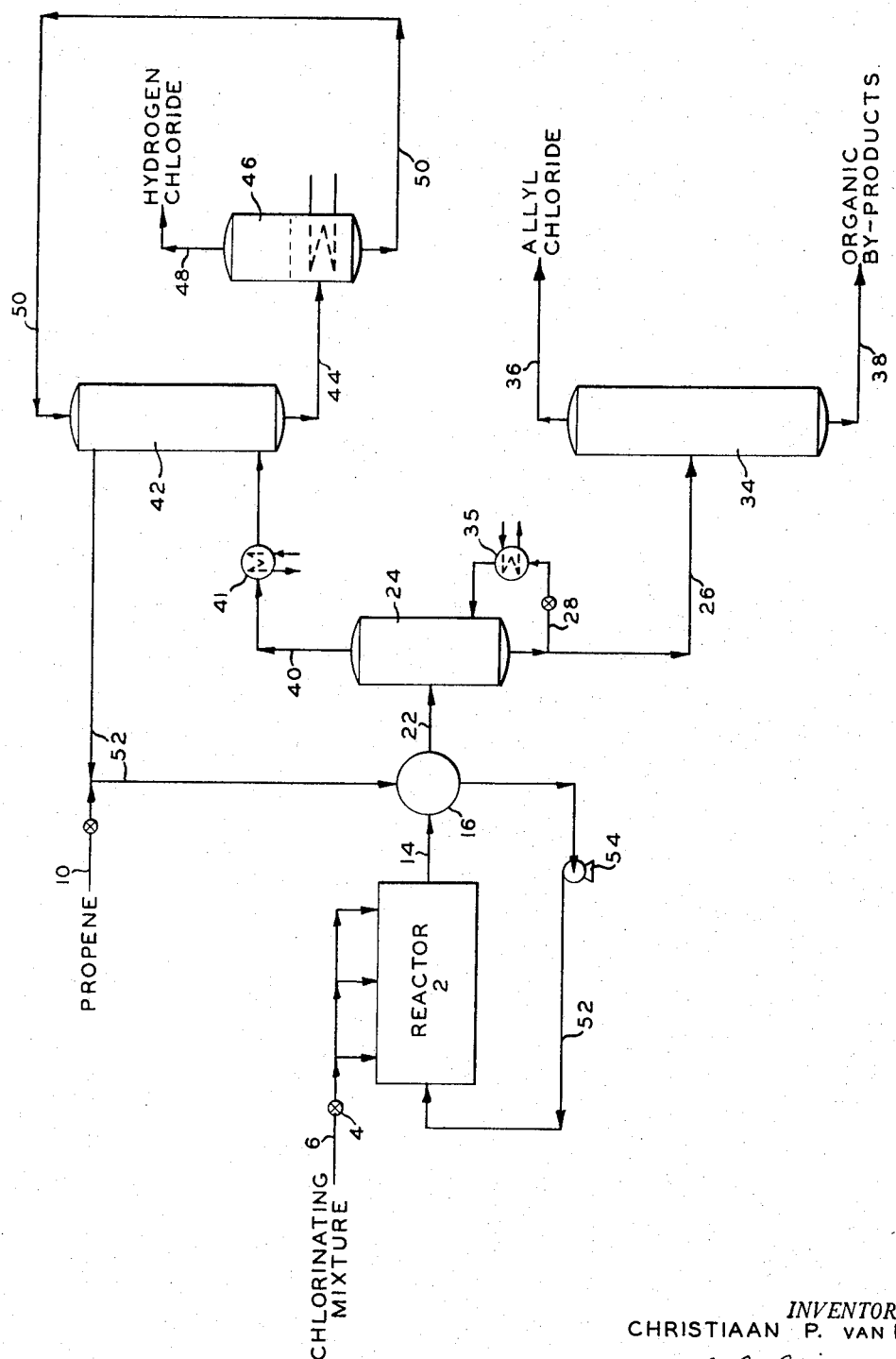

3,356,749
HYDROGEN HALIDE RECOVERY PROCESS
Christiaan P. van Dijk, Westfield, N.J., assignor to Pullman Incorporated, a corporation of Delaware
Filed May 2, 1963, Ser. No. 277,555
11 Claims. (Cl. 260—650)

This invention relates to a process for the recovery of an inorganic halide from a gaseous mixture. The invention also relates to an improved process for the halogenation of hydrocarbons. In one aspect, the invention relates to the recovery of inorganic halide in the process for the halogenation of unsaturated hydrocarbons to produce unsaturated halogenated products in high yield and selectivity. Another aspect of this invention relates to the chlorination of low molecular weight olefins to produce the corresponding unsaturated chlorohydrocarbon under conditions which minimize formation of by-products.

Many processes for the halogenation of hydrocarbons exist wherein an unsaturated hydrocarbon is treated with a halogen to produce a mixture of products containing some unsaturated halohydrocarbon. However, a large proportion of the products produced are polyhalogenated saturated or unsaturated products of the unsaturated hydrocarbon which do not have the marketability and useful applications of the unsaturated monohalogenated product. These monohalogenated products are valuable in the production of various synthetic materials, e.g., as monomers in the products of valuable polymers. The fact that most processes now being used produce 50–70 percent of the desired unsaturated products and the large amounts of polyhalo by-products in the mixtures obtained, suggests the need for a more selective halogenation process.

Another difficulty with the processes heretofore employed, is that the mixture of products produced have boiling points which do not permit ease of separation. Azeotropes in the product mixture are formed and many steps such as scrubbing, absorption, extraction, multi-distillations, etc., must be employed in order that the valuable unsaturated monohalogenated compounds be recovered. These numerous separation stages militate against efficient and economical operation.

Also, in regard to these mixtures, because of the reactivity of the unsaturated products, side-reactions in the mixtures produced, take place in varying degrees depending upon the nature of the particular halogenated olefin and the length of time the reactive species remain in contact. Thus, a more efficient method of treating reactor effluent gases for the separation of components is needed.

It is, therefore, an object of the present invention to provide a process which overcomes the above-mentioned difficulties while at the same time provides for efficient and economic operation for commercial application.

Another object of this invention is to provide a process for producing unsaturated halohydrocarbons in high yield and selectivity.

Another object of the invention is to eliminate the difficulties associated with the separation of the unsaturated halohydrocarbon from the reactor effluent.

Another object is to provide a process for efficient and economical removal of inorganic halides from the reactor effluent in a hydrocarbon halogenation process.

Still another object of the invention is to provide a completely regenerative process for accomplishing the above objects in an economically attractive process.

Yet another object of the invention is to provide allyl chloride from propylene and chlorine in a yield greater than 90 percent by weight.

These and other objects of this invention will become apparent to those skilled in the art from the following description and disclosure.

The invention as hereindescribed relates to an improved method for halogenating a hydrocarbon and to an improved method for recovering hydrogen halide from a gaseous mixture, preferably the gaseous effluent obtained from the improved halogenation of a hydrocarbon as hereinafter described. According to this invention, a selective process for the production of monohaloolefin is obtained by halogenating an olefinic hydrocarbon under certain critical conditions. In accordance with the halogenation reaction of this invention, an unsaturated hydrocarbon is reacted with a halogen which has been diluted with an inorganic halide under conditions such that a high molecular excess of hydrocarbon to halogen, in excess of 5:1, is employed in the reaction zone and the reaction zone is maintained under elevated pressure in excess of 400 p.s.i.g. during halogenation. Conducting the halogenation reaction with the diluted halogenating agent under these critical conditions results in high selectivity with respect to the corresponding unsaturated monohalogenated product.

Also, in accordance with this invention, a hydrogen halide-containing gaseous mixture such as the halogenation reactor effluent obtained either from this selective hydrocarbon halogenation process or the reactor effluent obtained from a halogenated process operated under conditions previously employed, wherein a lower molecular amount of hydrocarbon and lower pressure (for example, atmospheric pressure), is employed in the reaction zone, is treated in an adiabatic system for the removal of inorganic halide impurities. This improved treatment of reactor effluent consists of passing the effluent in contact with a dilute inorganic halide extraction solution under adiabatic conditions in order to extract from the effluent inorganic halide compounds such as the hydrogen halide and, in most cases, when the effluent is at an elevated temperature, to cool the effluent by direct heat exchange with the dilute solution. The heat of sorption, resulting from the extraction of the inorganic halide compound, is dissipated by flashing the resulting enriched halide extraction solution under adiabatic conditions to vaporize the sorbed inorganic halide and to restore the original concentration of the dilute halide extraction solution. The resulting self-regenerated extraction solution can then be recycled to the extraction zone for further contact with additional quantities of effluent gas after adjusting the temperature to that required in the zone. This may be done by partially or totally cooling the recycle stream after flashing. The treated effluent from which inorganic halide contaminant, and in some cases water, has been removed is then withdrawn from the extraction zone and treated for recovery of organic halogenated product.

Although any of the unsaturated hydrocarbons employed in previous processes for the purpose of halogenation can be used in the improved halogenation process of the present invention, the preferred hydrocarbons are those which are unsaturated and contain between 2 and 7 carbon atoms; most prefered of this class of compounds are those unsaturated compounds selected from the group consisting of ethylene, propene and benzene. Other unsaturated hydrocarbons, particularly useful in this process include butene, butadiene, isoprene, methylbenzene, etc. Also, chlorinated or brominated unsaturated derivatives of these hydrocarbons can be suitably employed in the present process to produce the next higher halogenated adduct.

The halogenating agents employed in the present halogenation process can also be any of those employed in previous halogenation processes and include fluorine, chlorine, bromine and iodine. In the improved recovery of hydrogen halide from a gaseous mixture, the mixture can be derived from any of the previously known halogenation or hydrohalogenation processes or can be the mixture obtained from the improved halogenation process of the present invention. In the case of oxyhalogenation processes, the halogen is the reactive species in halogenating the hydrocarbon, but oxidation of a hydrogen halide is carried out simultaneously in the reaction zone to produce the halogen reactant. For example, hydrogen chloride can be oxidized to chlorine in the presence of a hydrocarbon; and the hydrocarbon, acting as a chlorine acceptor, is in turn chlorinated in the same zone under the same conditions. However, the preferred process of the present invention employs direct halogenation of the olefinic hydrocarbon in the absence of hydrogen halide oxidation. Of the halogenating agents employed, the preferred halogenator, for the purposes of the present invention is chlorine, since the uses of the chlorinated products are far more extensive and well known than, for example, iodohydrocarbons which, in some cases, are relatively unstable.

In the improved halogenation process of the present invention halogenating agent is diluted with an inorganic halide such as hydrogen halide to produce a feed mole ratio of the unsaturated hydrocarbon to halogen in excess of at least 5:1, preferably a mole ratio between about 10:1 and about 20:1. The hydrocarbon and halogen are reacted under turbulent conditions in a reaction zone maintained at a pressure above 400 p.s.i.g., preferably above 500 p.s.i.g., and most preferably, between 1300 p.s.i.g. and 3000 p.s.i.g. In the feed to the reactor of the presently improved process the mole ratio of olefin e.g. propylene, to combined halogen e.g. chlorine, and halogenated product, e.g. allyl chloride, which is not recovered from the recycle stream is also in excess of 5:1. The dilution of the halogen and pressure are critical factors in obtaining high selectivity in the production of monohalo-olefin product. A greater excess of hydrocarbon can be provided by dilution if desired; however, from an economic standpoint, a larger excess is not recommended since it is not required to obtain high yields of the desired product and high selectivity of the process. The compounds in the reaction zone are reacted at a temperature between 200° C. and 800° C., preferably, in the case of aliphatic unsaturated hydrocarbons, at a temperature between 450° C. and 600° C. Multi-point introduction of the halogenating agent has been found to improve mixing and turbulence is the reaction zone and is, therefore, recommended. It has also been found to increase the yield of halogenated product.

The high selectivity of monohalogenation of the olefin reactant is not realized unless the dilution of the halogenating agent is maintained to provide a molar excess of hydrocarbon to halogenating agent in excess of 5:1. Dilution of the halogenating agent allows the use of high pressure in the reactor without the danger of explosion due to improper distribution of the reactive hydrocarbon species. This is not realized when a high concentration of hydrocarbon is maintained, but dilution is omitted or when the hydrocarbon is deleted and introduced in a high molar excess into the reaction zone. Dilution of the halogenating agent assures avoidance of incidents where, due to local concentration of the halogen, the generation of heat in local areas is sufficient to induce explosion. The halogenating agent, e.g., normally gaseous halogen, employed in this reaction is preferably diluted with a hydrogen halide having the same halogen as the halogenating agent. The resulting halogenating medium, upon introduction to the reaction zone, is in a mole ratio of between about 1:1 and about 6:1 or higher, preferably for chlorine, between about 2:1 and about 3:1 hydrogen halide:halogen. It is also found that the degree of dilution decreases as the atomic number of the halogen increases. Thus, when fluorine is the halogenating agent, dilution with hydrogen fluoride in a mole ratio of at least 6:1 is recommended. It is to be understood, however, that undiluted halogen gas has been employed as the chlorinating agent in the previous processes which were operated at low pressure, but it is now discovered that dilution of the halogenating agent provides better temperature control in the reaction zone and thus minimizes the formation of saturated by-products, while eliminating the necessity for pre-mixing reactants prior to their introduction into the reaction zone. The high molar excess of hydrocarbon in the reaction zone provides the high selectivity to the monohalogenated product and the high pressure under which the reaction is conducted facilitates the recovery of reaction products since the products can be separated from their mixtures by simple condensation in heat exchange with cooling water. Thus, the present process not only provides economic improvements in commercial operations, but also improves the efficiency and selectivity of halogenation processes in general.

The pressure at which the reaction zone is maintained in the highly selective process is an important factor contributing to the high conversion of unsaturated monohalogenated hydrocarbon product. Pressures between about 490 p.s.i.g. and about 4000 p.s.i.g., preferably between 500 p.s.i.g. and 3000 p.s.i.g., most preferred between 1300 p.s.i.g. and 2000 p.s.i.g. are advantageously employed. The more dilute halogen gas mixtures, e.g., at least 4:1 mole ratio of hydrogen halide:halogen, are preferred for the higher pressures, e.g., 1200 p.s.i.g. and above. At the higher pressure, a direct isolation of liquid hydrogen chloride by condensation is possible, preferably by the use of cooling water alone. In these cases, pressures between 1000 p.s.i.g. and 2000 p.s.i.g. are advantageously employed.

After reacting the components of this process under the critical conditions given above, or under conditions of conventional halogenation processes, e.g., atmospheric pressure and a hydrocarbon:halogenation agent ratio of from about 1:1 to about 3:1, the reactor effluent gases can be subjected to an improved recovery treatment wherein the effluent is contacted with an inorganic halide extraction solution in an adiabatic system. Although an aqueous solution of the hydrogen halide is the preferred extraction medium, solutions also containing metal halide extraction agents such as, for example, lithium chloride and calcium chloride, when the extraction solution and the effluent contains hydrogen chloride, can also be employed. Certain advantages are gained in employing these chlorides. For example, when treating reactor effluent gases containing water in addition to hydrogen halide contaminant, hygroscopic lithium chloride has been found to reduce the water content of the effluent gas.

Other liquid media having boiling points above the hydrogen halide and having a higher boiling point than water, in cases where water is also extracted from the reactor effluent, can be used to dilute the extraction agent. In the case of reactor effluents from an oxychlorination reaction having a relatively high water content, a non-aqueous liquid extraction medium is advantageously restored to its original concentration by flashing off both sorbed hydrogen halide and sorbed water.

In the preparation of phenol from benzene wherein benzene is reacted with chlorine obtained from the oxidation of hydrogen chloride in a chlorination zone to produce chlorobenzene and the chlorobenzene is hydrolyzed in a hydrolysis zone to produce phenol, water and hydrogen chloride is present in the effluents from both the halogenation and the hydrolysis zones. Because of the corrosive nature of this mixture, it has been the practice to approach as near as possible complete conversion of the hydrogen chloride in the chlorination zone. In order to obtain this result, a low hydrogen chloride partial pressure must be maintained. Even the effluents produced by this method must be subjected to azeotropic distillation for separation of products in order to avoid condensation of the small, but corrosive amounts of aqueous hydrogen chloride. By employing the process of the present invention and treating the effluents of both the chlorination and hydrolysis zones with a dilute halide solution containing a hygroscopic chloride (e.g., aqueous calcium chloride) in an extraction zone, relatively high partial pressures of hydrogen chloride and oxygen may be used in the halogenation zone, thus enabling the use of higher space velocities in a more efficient operation in the hydrolysis zone. Also it has now been found that by applying the effluent treating process of the present invention, the azeotropic distillation of effluent from the hydrolysis zone in the above process can be eliminated and easy separation of products made subsequent to extraction in non-acid-resistant distillation apparatus and employing non-acid-resistant heat exchangers. For substantially complete drying of the effluents in this process, a water dew point of between 30° C. and 60° C. is preferably maintained on the dried effluent withdrawn from the extraction zone or zones.

The gaseous effluent from the reactor in any of the halogenation processes herein discussed, is preferably passed in countercurrent contact with the halide extraction liquid and is thereby treated for the removal of inorganic halides, preferably at a temperature of between about 10° C. and about 100° C. When the reactor effluent contains water and halohydrocarbons having from 2 to 7 carbon atoms, the effluent is dried to a water dew point of between 30° C. and 60° C. or less, under which conditions, a substantially anhydrous, halide-free effluent mixture is obtained.

The resulting halide-enriched solution which is heated as a result of direct heat exchange with the effluent gas and/or the heat of sorption, is then flashed to restore its original concentration and temperature for recycle to the extraction zone. The relatively pure hydrogen halide withdrawn as a gas from the flashing zone can, if desired, be recycled in a controlled amount to establish the concentration of the halogenating agent in the halogenation reaction zone in cases where hydrogen halide is employed in the reactor. Alternatively, the halide-enriched solution can be flashed to dissipate only the heat of sorption while any temperature increase due to heat exchange with reactor effluent is removed by a heat exchanger.

In the extraction step, it is now discovered as a particular aspect of this invention, that when a high volume ratio of hydrogen halide extraction liquid to hydrogen halide gas in the effluent, e.g., above 10:1 is maintained in the extraction zone, preferably between about 15:1 and about 100:1 by weight, optimum cooling of effluent and an advantageous heat exchange and heat of sorption is given up to the extraction medium to provide optimum efficiency in flashing. Surprisingly, under these conditions, the sorption of hydrogen chloride can be effected up to about 7 percent of the hydrogen chloride in the initial extraction media.

The effluent gases from the extraction zone, containing in addition to halogenated product, unreacted hydrocarbon and smaller amounts of organic by-products can be recycled, at least in part, to the reaction zone as a portion of the feed thereto after the desired unsaturated monohalogenated hydrocarbon product is separated from the mixture.

Between the reaction zone and the extraction zone, at least three separate methods of treating the reactor effluent gas can be employed. For example, the reactor effluent gases can be cooled and passed directly to the extraction zone wherein condensation of the unsaturated monohalogenated hydrocarbon is effected simultaneously with the extraction of the hydrogen halide from the mixture. Another alternative is to cool the effluent gases from the reactor so that at least a portion, preferably a major portion, of the unsaturated monohalogenated hydrocarbon is condensed from the mixture and then subject only the remaining gaseous mixture to the halide extraction. Still another alternative is to pass the reactor effluent gases without cooling directly into the extraction zone to remove inorganic halides therefrom and after removing the gaseous mixture from the extraction zone, to either condense out the desired monohalogenated hydrocarbon or to condense the entire mixture and distill the desired monohalogenated hydrocarbon from the condensate. In the last case, the extraction is performed at relatively high temperatures, for example, between about 150° C. and about 225° C.

The extraction medium, most preferably being hydrogen chloride, is an aqueous solution of between about 18 percent and about 40 percent by weight halide concentration. Although it is to be understood that other solutions of the hydrogen halide such as hydrogen halide dissolved in dioxane, higher boiling ethers can be employed, if desired, to replace water either totally, or in part. The concentration of inorganic halide in the liquid medium can vary from about 15 percent to about 40 percent, although a halide concentration of from 20 percent to 30 percent is preferred.

Reference is now had to the drawing which illustrates a specific embodiment of this invention and is not to be construed as in any way limiting to the scope of the present invention.

The drawing illustrates the process as it applies to the preparation of allyl chloride obtained from the reaction between propene and chlorine; although, it is to be understood that in the process described below, other unsaturated hydrocarbons such as butylene, chlorobutylene, etc., can be substituted for propene to provide the corresponding butylene chloride and dichlorobutylene, and other halogenating mixtures such as, for example, bromine-hydrogen bromide can be substituted to produce the corresponding monobrominated product. In the embodiment shown by the drawing, a mixture of 1 mole of chlorine and 4 moles of hydrogen chloride are introduced into chlorination reactor 2 by multi-point injection from valved line 6 wherein valve 4 controls the amount of chlorinating mixture introduced to maintain a mole ratio of 15:1 propene:chlorine fed to the reactor. About 16.5 moles of a propene mixture containing 1.5 moles of hydrogen chloride is also introduced into reactor 2 for linear flow therethrough from line 52. The reactor is maintained under 500 p.s.i.g. and at a temperature ranging from 460° C. to 510° C. and turbulence is maintained therein by the multi-point injection of chlorinating agent against the linear flow of unsaturated hydrocarbon. The gaseous reaction mixture is passed through the reaction zone at a rate of 21.5 moles per hour and is withdrawn at a temperature of about 510° C. by means of line 14 and cooled in indirect heat exchanger 16 to about 225° C. The effluent withdrawn from the heat exchanger 16 by means of line 22 contains 0.45 mole of allyl chloride, 14 moles of unreacted propene, 6.5 moles of hydrogen chloride and a small amount of dichloropropene. This effluent is then introduced into the middle of distillation tower 24 and the top of this tower is maintained at 50° C. Substantially all of the allyl chloride and higher boiling materials condense and are withdrawn from distillation tower 24 by means of line 26 and a bleed stream is drawn off by means of line 28, heated in heater 35 to a temperature of 75° C. and recycled to reboiler tower 24. The liquid mixture is passed from line 26 into distillation column 34 wherein vaporous allyl chloride is recovered as the product of the process.

The uncondensed gaseous portion consisting of a mixture of hydrogen chloride and propene is withdrawn from tower 24, warmed up to 90° C. in steam-fed heat exchanger 41, and passed by means of line 40 into extraction zone 42 wherein at a temperature of about 85° C., under 475 p.s.i.g., the gaseous mixture is countercurrently contacted with a 36 percent aqueous solution of hydrogen chloride. The feed stream of this liquid in extraction zone 42 is maintained at about 100 parts by weight per part of hydrogen chloride absorbed. In the extraction zone, about 75 percent of the hydrogen chloride gas is absorbed in the 36 percent hydrogen chloride solution so that the hydrogen chloride solution, which is withdrawn from the lower portion of the extraction zone by means of line 44, is enriched to a hydrogen chloride concentration of 36.6 percent. The liquid withdrawn in line 44 has been heated in zone 42 to a temperature of about 90° C. by the direct heat exchange with the vapors from line 40, and by the heat of sorption. This increased heat which is controlled by the gas:liquid ratio in zone 42 is used to flash off excess hydrogen chloride and to restore the enriched solution to its original concentration in flashing zone 46 which is maintained at a temperature of 85° C. and a pressure of 22 p.s.i.g. The liquid from line 44 is passed into the lower portion of zone 46 and substantially pure hydrogen chloride is vaporized and is withdrawn by means of line 48. At least a portion of the hydrogen chloride can be used as diluent for chlorine feed in line 6, if desired, after absorption in liquid chlorine and compression to the inlet pressure.

The remaining liquid in zone 46, which is restored to its original 36 percent hydrogen chloride concentration, and which is cooled to a temperature of about 85° C. by virtue of flashing, is then withdrawn from the lower portion of the flashing zone and re-introduced into the top of extraction zone 42 by means of line 50 for further countercurrent contact with effluent gases from line 40. The extraction zone is maintained under 475 p.s.i.g.

The effluent gas which has been subjected to extraction and from which a substantial amount of hydrogen chloride has been removed, is withdrawn from the upper portion of zone 42 by means of line 52, mixed with 1 mole of fresh propene feed introduced into line 52 by means of valved line 10 in an amount sufficient to maintain the 15 moles of propene in the feed to reaction zone 2 and the combined vapors in line 52 are passed through indirect heat exchanger 16 for indirect heat exchange with reactor effluent before being recycled to reactor 2 by means of pump 54 in line 52. In heat exchanger 16, the propene feed mixture is heated to a temperature of 460° C. and the reactor effluent gases are cooled to 225° C. The heated propene feed is then returned to reactor 2 and reacted with chlorine in a molar proportion of 15:1.

The allyl chloride product mixture condensed in distillation tower 24 containing only trace amounts of other organic by-products such as dichloropropene and dichloropropane is passed by means of line 26 into distillation zone 34 wherein at a temperature of 47° C. under 1 p.s.i.g., allyl chloride is recovered as a vaporous product in line 36 and the remaining liquid containing the organic by-products is withdrawn from the distillation zone by means of line 38.

It is to be understood that in the above embodiment bromine or iodine can be substituted for chlorine and hydrogen bromide and hydrogen iodide can be respectively substituted for hydrogen chloride in the production of the corresponding allyl bromide or allyl iodide compounds.

The following example illustrates the improved process for the production of allyl chloride wherein propene is reacted with the diluted halogenating mixture of the present process. It is to be understood, however, that other olefinc compounds such as, for example, butene, butadiene, etc., can be substituted for propene in this example and that other halogenating mixtures such as, for example, hydrogen bromide-bromine can be substituted to obtain the high selectivity to the corresponding monohalogenated product.

*Example 1*

Fifteen moles of propene and a mixture of 1 mole of chlorine and 4.5 moles of hydrogen chloride are injected at 460° C. under 1000 p.s.i.g. into a reaction zone where they are contacted under turbulent conditions. A conversion of 6.4 percent with 96 selectivity to monochloropropene is obtained in the reactor and the 20.5 moles of exit gas are passed to a heat exchanger wherein the gaseous mixture is cooled to 75° C. In this heat exchange operation, a portion of the gases are condensed and the resulting gaseous and liquid mixture is fed to a distillation tower wherein at a top temperature of 42° C. and a bottom temperature of 128° C. under 990 p.s.i.g., propene, allyl chloride and higher boiling products are recovered as a liquid fraction. This liquid fraction is then passed to a second distillation tower wherein at a top temperature of 43° C. and a bottom temperature of 150° C. and a pressure of 260° p.s.i.g. allyl chloride and higher boiling products are recovered as a liquid fraction, while the overhead propene vapor is recycled to the reactor. The liquid is finally passed to a third distillation tower from which allyl chloride is separated as the vaporous product from the liquid by-products at a temperature of 45° C. under 15 p.s.i.g. The vaporous hydrogen chloride, the top product of the first distillation tower, is condensed at 42° C. and admixed with feed chlorine in a mole ratio of 4.5:1 and recycled to the reaction zone as the chlorination feed thereto.

The liquid propene fraction condensed at the top of the second distillation zone is withdrawn and pumped in indirect heat exchange with effluent gases from the halogenation reactor and then heated in a second heat exchanger to a temperature of 460° C. and recycled to the halogenation reaction zone under a pressure of 1000 p.s.i.g. Fresh propene feed is added to this recycle stream, before it is heated, to provide a mole ratio of propene to chlorine entering the reactor of about 15:1.

This example illustrates the embodiment in which extraction and vaporization for the separate recovery of hydrogen chloride and propene are eliminated and the recovered reactants are directly recycled to the reaction zone after adjusting the temperature and pressure.

*Example 2*

Benzene (14 moles) and a mixture of 5 moles of chlorine and hydogen chloride (in a mole ratio of 1:4) are fed into a reaction zone wherein at a temperature of about 350° C. under 300 p.s.i.g., the chlorine reacts with benzene to produce monochlorobenzene in about 10 percent yield and 95 percent selectivity. The gaseous product mixture containing benzene, monochlorobenzene, polychlorinated benzenes, and hydrogen chloride is withdrawn and cooled in a heat exchanger to a temperature of 90° C. This cooled material is then passed to a condenser tower wherein, at a temperature of 42° C. under 290 p.s.i.g., benzene, the monochlorobenzene and higher boiling materials are condensed. The gases are contacted at the top of this tower with a stream of monochlorobenzene at a temperature of 42° C. The cooled gases at the outlet of this tower are practically pure hydrogen chloride and contain only a trace of chlorobenzene. This gas is compressed, recycled to the inlet of the reactor and mixed with chlorine prior to introduction into the reactor. The liquid is withdrawn at the bottom of the tower, recycled through a reboiler heater at a temperature of 225° C. The resulting liquid and vapors are sent back to the bottom of the tower. Part of the liquid is withdrawn so as to keep a constant level in the bottom of the condenser tower, and fed to a distillation tower, wherein at 10 p.s.i.g., a top temperature of 100° C. and a bottom temperature of 154° C., a separation is made between benzene and the chlorobenzenes. The chlorobenzene condensate mixture is passed to a second fractionation zone to separate chlorobenzene from by-products, such as dichlorobenzene. The chlorobenzene can be used as such or can be hydrolyzed to phenol.

It is to be understood of course that other aromatic hydrocarbons can be substituted for benzene in the above example and that other halogenating agent mixtures such as hydrogen fluoride-fluorine, hydrogen bromide-bromine and hydrogen iodide-iodine can be substituted for hydrogen chloride-chlorine in the above example to provide the monohalogenated product.

Having thus described my invention, I claim:

1. In the extraction of hydrogen halide from a mixture containing said hydrogen halide and a halogenated hydrocarbon having not more than 7 carbon atoms, the improvement which comprises: in an extraction zone, countercurrently contacting the mixture with a solution of hydrogen halide wherein the hydrogen halide of the solution is dissolved in an inert solvent and is maintained at a concentration between about 15 percent and about 40 percent by weight of halide; maintaining a weight ratio in excess of 10:1 of the hydrogen halide in the solution with respect to the hydrogen halide in the mixture; extracting the hydrogen halide from the mixture in the hydrogen halide solution and increasing the concentration of the halide in the solution while allowing the temperature of said solution to rise in accordance with the heat of absorption; withdrawing and passing the heated hydrogen halide-enriched solution from the extraction zone to a flashing zone; in the flashing zone utilizing the heat generated in the extraction zone to adiabatically flash the hydrogen halide-enriched solution and vaporizing the portion of the hydrogen halide absorbed in the extraction zone; separating substantially pure hydrogen halide vapors from the flashing zone; and recycling the remaining hydrogen halide solution which is cooled by flashing to the extraction zone at the concentration and temperature maintained therein.

2. The process of claim 1 wherein the gaseous mixture from the reaction zone also contains water and the halogenated hydrocarbon is obtained in an oxyhalogenation process wherein the halogen obtained from the oxidation of hydrogen halide is reacted with a hydrocarbon and wherein the hydrogen halide solution sorbs both hydrogen halide and water from the gaseous mixture.

3. In a process for separating a halogenated hydrocarbon containing not more than 7 carbon atoms from a hot gaseous mixture containing hydrogen halide, obtained from the reaction of halogen with a hydrocarbon of not more than 7 carbon atoms at a temperature of at least 200° C., the improvement which comprises: countercurrently contacting, in an extraction zone, the hot gaseous mixture with an aqueous solution of hydrogen halide wherein the halide of the solution is the same as the hydrogen halide of the mixture, the concentration of the halide in the solution is between about 15 percent and about 40 percent by weight and the temperature of the solution entering the reaction zone is maintained at least 100° below the reaction temperature; maintaining a weight ratio in excess of 10:1 of hydrogen halide in the solution with respect to the hydrogen halide in the gaseous mixture; absorbing the hydrogen halide from the gaseous mixture in the aqueous hydrogen halide solution, thereby increasing the concentration of the halide in the solution while allowing the temperature of said solution to rise in accordance with the heat of absorption and cooling the gases of the gaseous mixture; withdrawing and passing the hydrogen halide-enriched solution from the extraction zone to a flashing zone; separately withdrawing the gaseous halogenated hydrocarbon from the extraction zone and recovering said halogenated hydrocarbon as the product of the process; in the flashing zone, utilizing the heat generated in the extraction zone to adiabetically flash the hydrogen halide-enriched solution; vaporizing and separating from the flashing zone the portion of the hydrogen halide absorbed in the extraction zone; and recycling the remaining aqueous hydrogen halide solution, at about its original concentration, to the upper portion of the extraction zone at the temperature maintained therein.

4. The process of claim 3 wherein the hydrogen halide is hydrogen chloride, the halogen is chlorine and the halogenated hydrocarbon is a chlorinated hydrocarbon.

5. The process of claim 3 wherein the hydrogen halide is hydrogen bromide, the halogen is bromine and the halogenated hydrocarbon is a brominated hydrocarbon.

6. The process of claim 3 wherein the gaseous mixture from the reaction zone is passed directly to the extraction zone in the absence of cooling and the cooling of the gaseous mixture to a temperature at least 100° below the reaction temperature is accomplished in the extraction zone by direct heat exchange between the gaseous mixture and the hydrogen halide solution.

7. In the extraction of hydrogen halide from a mixture obtained from the reaction of a halogen with a hydrocarbon of not more than 7 carbon atoms at a temperature of at least 200° C. to produce a halogenated hydrocarbon product, said mixture containing said hydrogen halide, unreacted hydrocarbon and halogenated hydrocarbon product, the improvement which comprises: passing the gaseous mixture to the lower portion of an extraction zone, and, at a temperature from 10° C. to 225° C. but below the temperature of the reaction, countercurrently contacting the gaseous mixture with an aqueous solution of hydrogen halide from the upper portion of said extraction zone, wherein the halide of the solution is the same as the hydrogen halide of the gaseous mixture and the concentration of the halide in the solution is between about 18 percent and about 30 percent by weight halide; maintaining the weight ratio in excess of 10:1 of the hydrogen halide in the solution with respect to the hydrogen halide in the mixture; absorbing the hydrogen halide from the gaseous mixture in the aqueous hydrogen halide solution thereby increasing the concentration of the halide in the solution and raising the temperature of said solution by the heat of absorption; withdrawing and passing the hydrogen halide-enriched solution from the lower portion of the extraction zone to a flashing zone; withdrawing the gaseous unsaturated halogenated hydrocarbon product and unreacted hydrocarbon from the upper portion of the extraction zone and recovering said halogenated hydrocarbon product; utilizing the heat of absorption in the flashing zone to adiabatically flash the hydrogen halide-enriched solution to vaporize and separate the portion of the hydrogen halide absorbed in the extraction zone; and recycling the remaining aqueous hydrogen halide solution, at about its original concentration, to the upper portion of the extraction zone at the temperature maintained therein.

8. The process of claim 7 wherein the gaseous mixture from the reaction zone is cooled prior to extraction; the condensation of product and extraction of hydrogen halide takes place simultaneously in the extraction zone and the hydrogen halide-enriched solution and halogenated product are separately recovered as liquid streams while unreacted hydrocarbon is recovered as a vapor.

9. The process of claim 7 wherein the gaseous mixture from the reaction zone is cooled to condense at least the major portion of the halogenated product prior to extraction.

10. The process of claim 7 wherein the ratio of hydrogen halide in the solution to hydrogen halide in the gaseous mixture is maintained between about 15:1 and about 100:1.

11. In the extraction of hydrogen halide from a mixture obtained from the reaction of a halogen with a hydrocarbon of not more than 7 carbon atoms at a temperature of at least 200° C. to produce a halogenated hydrocarbon product, said mixture containing said hydrogen halide, unreacted hydrocarbon and halogenated hydrocarbon product, the improvement which comprises: passing the mixture to a distillation zone wherein the halogenated hydrocarbon product is separated as a liquid from a vaporous effluent containing the unreacted hydrocarbon and the hydrogen halide and recovering the halogenated hydrocarbon product; passing the gaseous effluent from the distillation zone to the lower portion of an extraction zone and countercurrently contacting the gaseous effluent with an aqueous solution of hydrogen halide wherein the halide of the solution is the same as the halide of the hydrogen halide in the gaseous effluent and the concentration of the hydrogen halide in the solution is between about 18 percent and about 30 percent by weight of halide; maintaining a weight ratio in excess of 10:1 of the hydrogen halide in the solution with respect to the hydrogen halide in the gaseous effluent; absorbing the hydrogen halide from the gaseous effluent in the aqueous hydrogen halide solution thereby increasing the concentration of hydrogen halide in the solution, raising the temperature of said solution by the heat of absorption, and cooling the remaining vapors; withdrawing and passing the hydrogen halide-enriched solution from the lower portion of the extraction zone to a flashing zone; withdrawing the gaseous unreacted hydrocarbon from the upper portion of the extraction zone and recycling said unreacted hydrocarbon to the reaction; in the flashing zone, utilizing the heat of absorption to adiabatically flash the hydrogen halide-enriched solution and to vaporize and separate the portion of the hydrogen halide absorbed by the solution in the extraction zone; and recycling the remaining aqueous hydrogen halide solution, at about its original concentration, to the upper portion of the extraction zone at the temperature maintained therein.

References Cited

UNITED STATES PATENTS

| | | | |
|---|---|---|---|
| 2,130,084 | 9/1938 | Groll et al. | 260—654 |
| 2,664,342 | 12/1953 | Johnson | 260—662 X |
| 2,839,589 | 6/1958 | Brown | 260—654 |
| 2,950,170 | 8/1960 | Harnisch et al. | 23—154 |
| 2,952,714 | 9/1960 | Milan et al. | 260—662 |
| 2,989,571 | 6/1961 | Eisenlohr | 260—662 |
| 3,085,117 | 4/1963 | Brown et al. | 260—654 |
| 3,120,568 | 2/1964 | Brown | 260—654 |
| 3,210,430 | 10/1965 | Knight | 260—662 |

FOREIGN PATENTS 586,845  11/1959  Canada.

OTHER REFERENCES

Hougen et al., Chemical Process Principles, Part I, Material and Energy Balances (Wiley and Sons, 1959, TP 155 H65), pages 86–87, 92.

LEON ZITVER, *Primary Examiner.*

K. V. ROCKEY, J. BOSKA, *Assistant Examiners.*